United States Patent
Hawes

(10) Patent No.: US 7,915,779 B2
(45) Date of Patent: Mar. 29, 2011

(54) STATOR WINDING FOR A SLOTLESS MOTOR

(75) Inventor: David E. Hawes, Broken Arrow, OK (US)

(73) Assignee: Allied Motion Technologies, Inc., Englewood, CO (US)

( * ) Notice: Subject to any disclaimer, the term of this patent is extended or adjusted under 35 U.S.C. 154(b) by 0 days.

(21) Appl. No.: 12/282,093

(22) PCT Filed: Mar. 7, 2006

(86) PCT No.: PCT/US2006/008260
§ 371 (c)(1),
(2), (4) Date: Feb. 6, 2009

(87) PCT Pub. No.: WO2007/102818
PCT Pub. Date: Sep. 13, 2007

(65) Prior Publication Data
US 2009/0230809 A1    Sep. 17, 2009

(51) Int. Cl.
*H02K 3/04* (2006.01)
(52) U.S. Cl. .................. 310/208; 310/180
(58) Field of Classification Search ............ 310/179, 310/180, 184, 201, 208, 251.1, 260, 596–598; 29/596–598
See application file for complete search history.

(56) References Cited

U.S. PATENT DOCUMENTS

| | | | |
|---|---|---|---|
| 3,623,220 A | 11/1971 | Chase et al. | |
| 4,831,293 A | 5/1989 | Krop | |
| 5,200,661 A | 4/1993 | Shramo et al. | |
| 6,568,065 B2 | 5/2003 | Graham et al. | |
| 2003/0020361 A1* | 1/2003 | Kaminski et al. | 310/261 |
| 2004/0084993 A1* | 5/2004 | Andersson et al. | 310/254 |
| 2004/0189131 A1* | 9/2004 | Lacaze | 310/180 |
| 2005/0073215 A1* | 4/2005 | Wang et al. | 310/261 |
| 2005/0116580 A1* | 6/2005 | Cairo | 310/261 |
| 2005/0218746 A1* | 10/2005 | Fukasaku et al. | 310/208 |
| 2005/0264129 A1* | 12/2005 | Kaminski et al. | 310/261 |

OTHER PUBLICATIONS

International Search Report for PCT/US2006/08260, dated Dec. 4, 2006.

* cited by examiner

*Primary Examiner* — Thanh Lam
(74) *Attorney, Agent, or Firm* — Heslin Rothenberg Farley & Mesiti P.C.

(57) ABSTRACT

A stator winding for a slotless motor is parallel with the longitudinal axis of the motor except at the end turns of the coil windings. The coils have concentrated windings with a pair of coils wired in series to form one phase of the stator windings. Each of the pair of coils are wound such that the magnetic flux produced by a dc current through the coils produces magnetic flux of opposite directions with respect to the rotor of the motor.

6 Claims, 4 Drawing Sheets

STATOR WINDING FOR A SLOTLESS MOTOR

TECHNICAL FIELD

The present invention relates to slotless motors, and, more particularly, to stator windings for a slotless motor.

BACKGROUND OF THE INVENTION

An application for slotless motors is for use in handheld medical equipment. Makers of such motors strive to provide high speed, high torque motors that can stay relatively cool under sustained full load operation. In the past the stator coils in these slotless motors have been twisted around the longitudinal axis of the motor for various reasons. U.S. Pat. No. 4,733,118 to Mikalko describes such a stator winding and one reason for the twisted coils.

What is needed is a stator coil that provides improved performance for such slotless motors compared to slotless motors with twisted stator windings.

It is a principal object of the present invention to provide a stator coil that provides improved performance for such slotless motors compared to slotless motors with twisted stator windings.

SUMMARY OF THE INVENTION

Briefly described, in one embodiment of the present invention a pair of coils for a slotless motor are wound with a continuous wire and wired as one phase of a three-phase stator, the wire in the coils being parallel with the longitudinal axis of the stator except at the ends of the stator where the wire is bent along a curve orthogonal to the longitudinal axis having a radius greater than an inner radius of the stator.

Also described in one embodiment of the present invention is a method of wiring a coil for a stator of a slotless motor by a) placing a first portion of a wire on a cylindrical form such that the first portion is parallel with the longitudinal axis of the form; b) placing a second portion of the wire substantially transverse to the longitudinal axis, the second portion being arcuate with a radius of curvature greater than the radius of the form; c) placing a third portion of the wire parallel with the longitudinal axis of the form and being circumferentially offset from the first portion with respect to the circumference of the form; and d) placing a fourth portion of the wire substantially transverse to the longitudinal axis, the third portion being arcuate with a radius of curvature with respect to the longitudinal axis that is greater than the radius of the form and having one end thereof in close proximity to an end of the first portion. Steps a) thorough d) are repeated for a predetermined number of times, and then steps a) through c) are repeated to thereby form a first coil.

The steps in the above paragraph are repeated to form a plurality of coils, each of the coils having first and third portions which are each circumferentially offset from all other first and second portions.

Further described in one embodiment of the present invention is a stator winding phase of a three-phase stator for a slotless motor that is parallel with the longitudinal axis of the motor except at the end turns of the winding.

BRIEF DESCRIPTION OF THE DRAWINGS

The accompanying drawings, which are incorporated into and form a part of the specification, illustrate several embodiments of the present invention, and together with the description, serve to explain the principles of the invention. The drawings are only for the purpose of illustrating a preferred embodiment of the invention and are not to be construed as limiting the invention. In the drawings.

Figure 1:
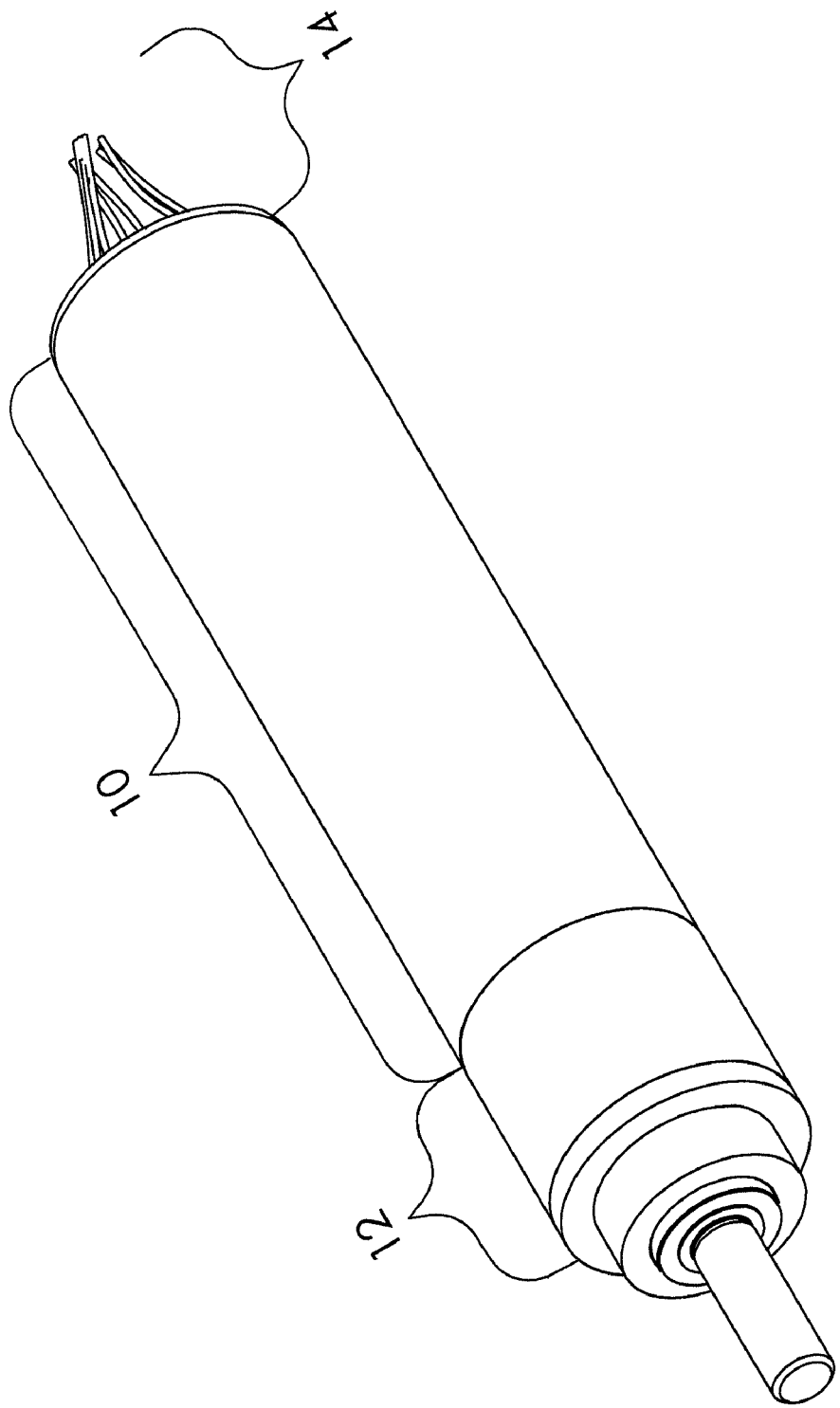
FIG. 1 is a perspective view of a slotless motor suitable for use in handheld medical equipment having a stator coil according to one embodiment of the present invention.

It will be appreciated that for purposes of clarity and where deemed appropriate the various elements in the drawings have not necessarily been drawn to scale in order to better show the features of the invention.

DESCRIPTION OF THE PREFERRED EMBODIMENTS

Turning now to the drawings FIG. 1 shows a perspective view of a slotless motor 10 suitable for use in handheld medical equipment having a stator coil according to one embodiment of the present invention. An inline gearbox 12 is attached to the motor, and a group of wires 14 provides connections to the three phases of the motor as well as to rotor position sensing electronics (not shown). The motor 10 is about 1½ inches long with a diameter of about ½ Inches making it of a size suitable for handheld medical equipment.

Figure 2:
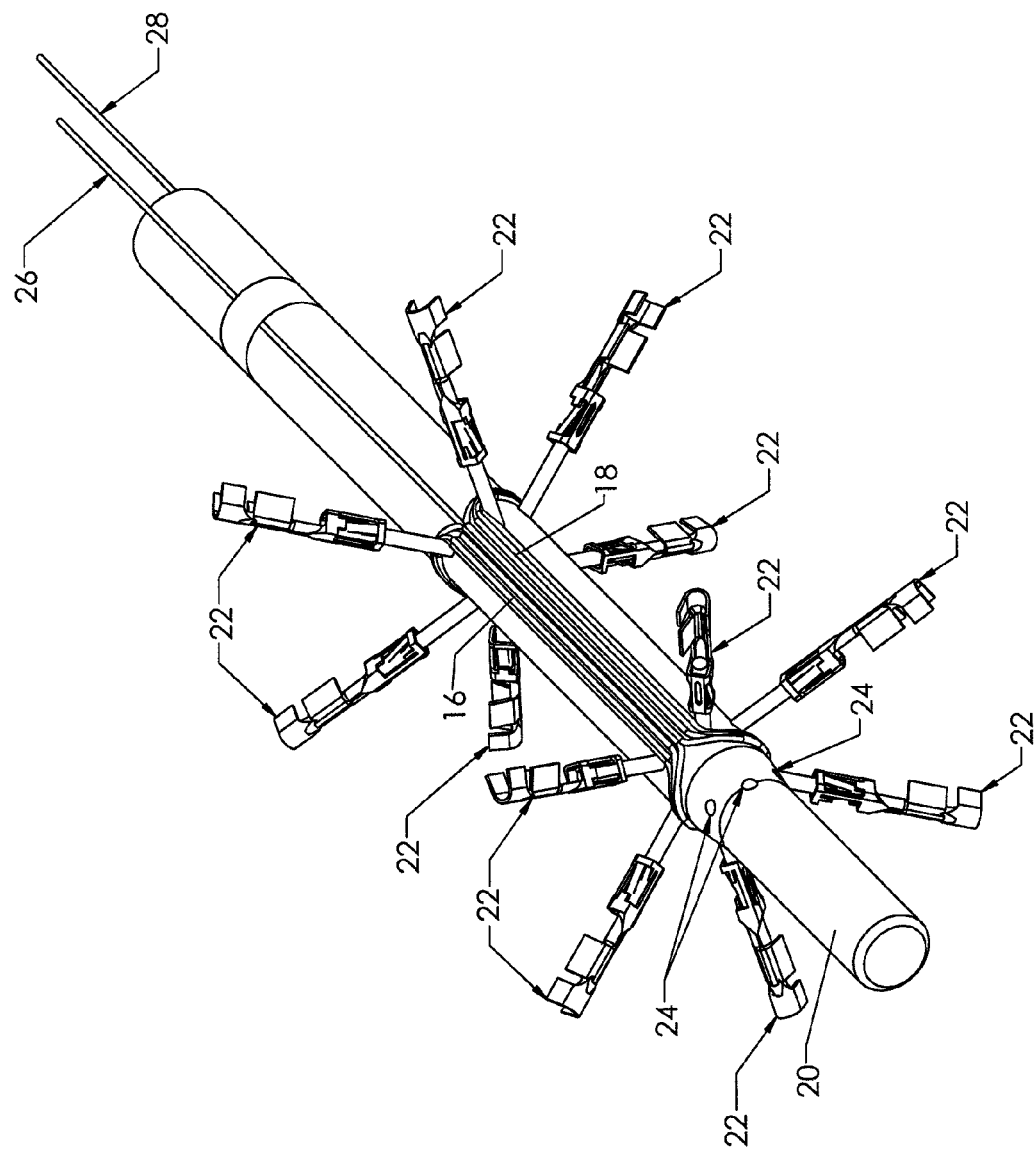
FIG. 2 is a perspective view of two coils in the slotless motor shown in FIG. 1 on a form used to wind the coils.

FIG. 2 is a perspective view of two coils 16 and 18 in the slotless motor 10 shown in FIG. 1. The coils 16, 18 are wound on a cylindrical form 20 which has twelve posts 22 inserted into holes 24 in the outer surface of the form 20 and around which the wire for the coils is wound. The coils 16, 18 lie parallel to the longitudinal axis of the form 20 (and therefore parallel to the longitudinal axis of the motor 10) except at the ends of the coils. Also the coils have concentrated windings to provide short end turns. By using coils that are parallel to the longitudinal axis rather than being twisted, the magnetic interaction between the rotor (not shown) and the coils 16, 18 is orthogonal to the coils 16, 18 thereby producing more back EMF in the coils 16, 18 than in twisted coils. As a result, the speed of the motor is improved, and the number of turns in each coil can be reduced thereby decreasing the losses in the end turns. Also, the decrease in the number of turns means a lower resistance in each coil which provides the motor 10 with greater torque compared to slotless motors with twisted coils. In addition, the lower current means lower $I^2R$ losses which decreases the heat generated by the motor. Finally, the coils 16, 18 result in a flatter curve for the torque and speed of the motor compared to slotless motors with twisted coils.

The coils 16, 18 are wired in series and form one phase of a three phase motor in the embodiment shown in FIG. 1. The ends 22 and 24 are the connections to the single phase formed by the coils 16, 18. In the preferred embodiment the single phase formed by coils 16, 18 has one end 22, 24 thereof connected at the neutral or common node of a Wye connection of the three phases A, B, and C. The rotor in the preferred embodiment is a 2-pole rotor. The two coils 16, 18 are in series and reversed in polarity producing a positive or negative back EMF due to the 2-pole rotor. The actual back EMF from Phase A to Phase B (or C) is a phasor sum of these back EMF's.

The two other phases have coils arranged as shown in FIG. 2 except that they are offset from the two coils 16, 18 by 60°.

Thus, each of the three phases of the stator overlap each of the other phases in the conventional manner.

Figure 3:
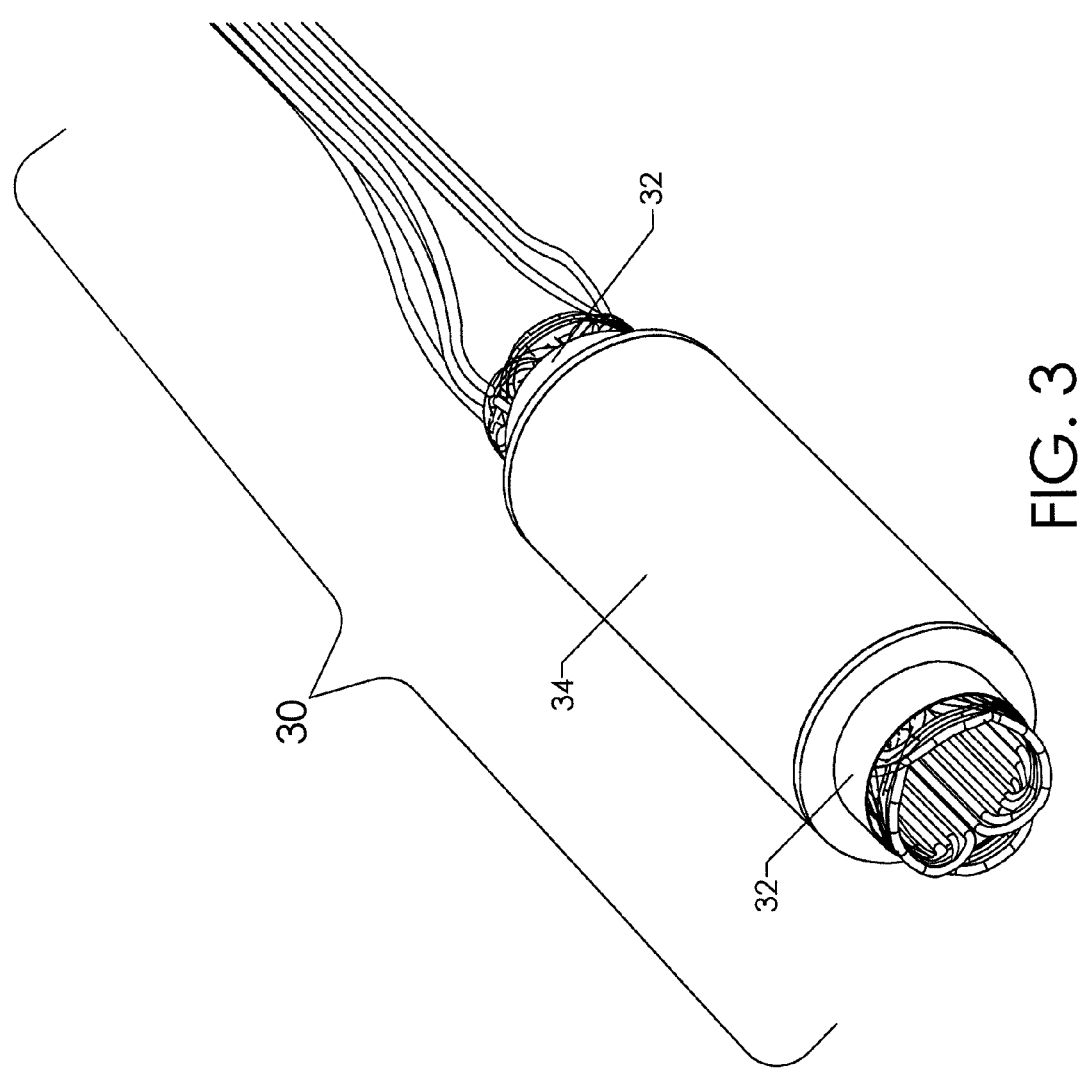
FIG. 3 is a perspective view of a completed stator used in the slotless motor shown in FIG. 1.

FIG. 3 is a perspective view of a completed stator 30 wherein the windings are covered with a thin insulator 32, and laminated rings 34 of permeable metal are slipped over the thin insulation 32.

Figure 4:
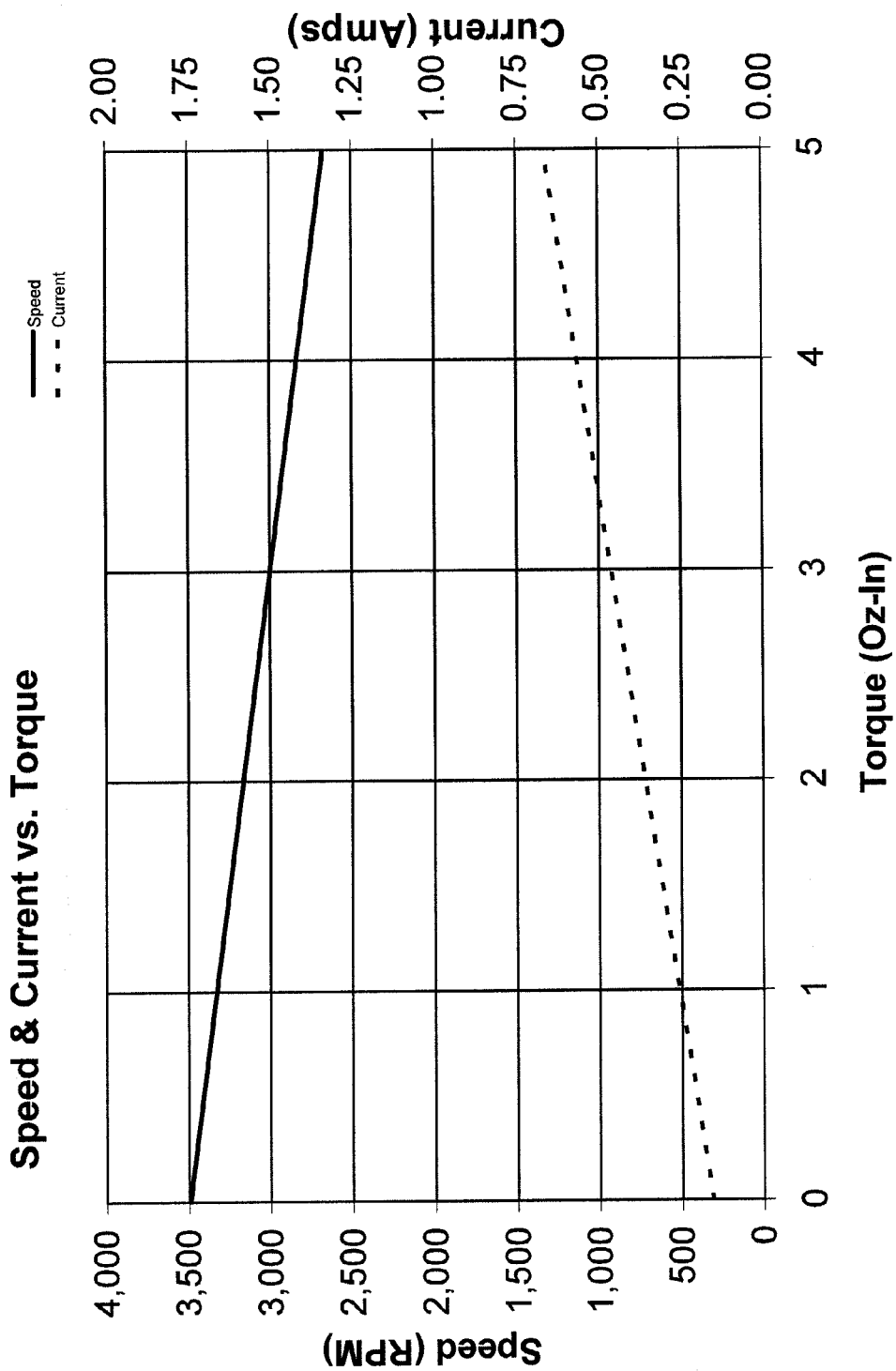
FIG. 4 is a graph of typical speed and torque characteristics of the type of motor shown in FIG. 1.

FIG. 4 is a graph of typical speed and torque characteristics of the type of motor shown in FIG. 1. As can be seen, the speed across the torque range of 0 to 5 Oz-Ins is fairly flat as is the current drawn by the motor 10 across the torque range.

The embodiment described is chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A pair of coils for a slotless motor wound with a continuous wire and wired as one phase of a three-phase stator, wherein the wire in the coils is parallel with the longitudinal axis of said stator except at the ends of said stator where said wire is bent along a curve orthogonal to said longitudinal axis having a radius greater than an inner radius of said stator.

2. The pair of coils set forth in claim 1, wherein the direction of the magnetic flux through the center of one of said coils is towards a region at least partially surrounded by said coils, and the magnetic flux through the center of one of said coils is away from a region at least partially surrounded by said coils.

3. A method of wiring a coil for a stator of a slotless motor comprising the steps of:
   a) placing a first portion of a wire on a cylindrical form such that said first portion is parallel with the longitudinal axis of said form;
   b) placing a second portion of said wire substantially transverse to said longitudinal axis, said second portion being arcuate with a radius of curvature greater than the radius of said form;
   c) placing a third portion of said wire parallel with the longitudinal axis of said form and being circumferentially offset from said first portion with respect to the circumference of said form;
   d) placing a fourth portion of said wire substantially transverse to said longitudinal axis, said third portion being arcuate with a radius of curvature with respect to said longitudinal axis that is greater than the radius of said form and having one end thereof in close proximity to an end of said first portion;
   e) repeating steps a) thorough d) for a predetermined number of times;
   f) then repeating steps a) through c} thereby forming a first coil;
   g) repeating steps a) through f) to form a plurality of coils, each of said coils having first and third portions which are each circumferentially offset from all other first and second portions.

4. The method set forth in claim 3 wherein one end of one coil is connected to one end of a second coil to form one phase winding.

5. The method set forth in claim 4 wherein said ends of said one and second coils connected together are selected such that a direct current flowing through said coils produces magnetic lines afflux which are toward a center of said coils in one of said coils and away from said center in the other of said coils.

6. A stator winding phase of a three-phase stator for a slotless motor that is parallel with the longitudinal axis of the motor except at the end turns of the winding.

* * * * *